US007327307B2

United States Patent
Adams et al.

(10) Patent No.: US 7,327,307 B2
(45) Date of Patent: Feb. 5, 2008

(54) RADAR SYSTEM WITH ADAPTIVE WAVEFORM PROCESSING AND METHODS FOR ADAPTIVELY CONTROLLING THE SHAPE OF A RADAR AMBIGUITY FUNCTION

(75) Inventors: Vinh Adams, Tucson, AZ (US); Wesley Dwelly, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 173 days.

(21) Appl. No.: 11/176,020

(22) Filed: Jul. 7, 2005

(65) Prior Publication Data

US 2007/0008213 A1 Jan. 11, 2007

(51) Int. Cl.
*G01S 7/292* (2006.01)
*G01S 13/00* (2006.01)

(52) U.S. Cl. .................. 342/159; 342/189; 342/162; 342/195; 342/90; 342/95; 342/109; 342/112; 342/115; 342/145

(58) Field of Classification Search ........ 342/159–163, 342/189, 195, 90, 95–97, 109, 112, 115, 128–135, 342/145
See application file for complete search history.

(56) References Cited

U.S. PATENT DOCUMENTS

| | | | | |
|---|---|---|---|---|
| 4,123,755 A * | 10/1978 | Fishbein et al. | ............. | 342/203 |
| 5,835,199 A * | 11/1998 | Phillips et al. | ............. | 356/5.03 |
| 6,225,943 B1 * | 5/2001 | Curley et al. | ............... | 342/137 |
| 6,864,834 B2 * | 3/2005 | Walton | ....................... | 342/195 |
| 7,196,657 B2 * | 3/2007 | Walton | ....................... | 342/195 |
| 7,233,700 B2 * | 6/2007 | Rajagopal et al. | ......... | 382/209 |
| 2004/0150555 A1 * | 8/2004 | Walton | ....................... | 342/195 |
| 2006/0012513 A1 * | 1/2006 | Walton | ....................... | 342/195 |
| 2006/0140249 A1 * | 6/2006 | Kohno | ....................... | 375/130 |
| 2006/0273951 A1 * | 12/2006 | Adams et al. | ............. | 342/159 |
| 2007/0008213 A1 * | 1/2007 | Adams et al. | ............. | 342/159 |
| 2007/0018884 A1 * | 1/2007 | Adams et al. | ............. | 342/147 |

* cited by examiner

*Primary Examiner*—John B Sotomayor
(74) *Attorney, Agent, or Firm*—John J. Horn

(57) ABSTRACT

An adaptive waveform radar system transmits a selected waveform of a family of related waveforms and either phase shifts or bit shifts the radar return signal for correlating with the other waveforms of the family. In some embodiments, phase shifting may be performed to null an unwanted target or clutter, while bit shifting may be performed to enhance a desired target, although the scope of the invention is not limited in this respect. In some embodiments, the bits of the return signal may be either phase shifted or bit shifted to match a bit of each one of the other waveforms of the family prior to correlation.

37 Claims, 10 Drawing Sheets

RADAR SYSTEM WITH ADAPTIVE WAVEFORM PROCESSING AND METHODS FOR ADAPTIVELY CONTROLLING THE SHAPE OF A RADAR AMBIGUITY FUNCTION

TECHNICAL FIELD

The present invention pertains to radar systems and methods for detecting targets.

BACKGROUND

Radar systems, such as those used for surveillance and tracking, must address challenging search and detection tasks for targets in various types of clutter and interference. Many radar systems search large areas of Doppler and space for small targets of interest while at the same time limiting the impact of interference and clutter. These requirements result in an increased number of false detections, which are sorted out in track files and/or detection algorithms. The presence of increased detections also increases the probability of dropping the intended target or tracking the wrong target. Another problem with increased detections is that a radar system may have to increase the number of looks to help discriminate the detections. This increases the time needed to identify a target, which is particularly undesirable for fast moving targets.

Some conventional radar systems address these problems by transmitting two or more complementary waveforms concurrently. These approaches, however, can significantly increase the complexity and cost of the radar system's hardware.

Thus, there are general needs for improved radar systems with reduced hardware complexity. There are also general needs for radar systems that can search large areas of Doppler and space for small targets of interest while at the same time limiting the impact of interference and clutter. There are also general needs for radar systems that generate less false detections. There are also general needs for radar systems with a reduced probability of dropping an intended target or tracking a wrong target. There are also general needs for radar systems that can improve a desired target's signal-to-noise ratio (SNR) and null out unwanted targets without additional transmissions (i.e., looks). There are also general needs for radar systems that can adapt their ambiguity function to current and changing environments.

SUMMARY

An adaptive waveform radar system transmits a selected waveform of a family of related waveforms and either phase shifts or bit shifts the radar return signal for correlating with the other waveforms of the family. In some embodiments, phase shifting may be performed to null an unwanted target or clutter, while bit shifting may be performed to enhance a desired target, although the scope of the invention is not limited in this respect. In some embodiments, the bits of the return signal may be either phase shifted or bit shifted to match a bit of each one of the other waveforms of the family prior to correlation.

In some embodiments, a subfamily of waveforms may be selected for re-correlating the return signal with waveforms of the selected subfamily to generate an enhanced detection output. In some further embodiments, radar ambiguity function shaping may allow adaptive waveform families to be generated and selected for a particular scenario.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
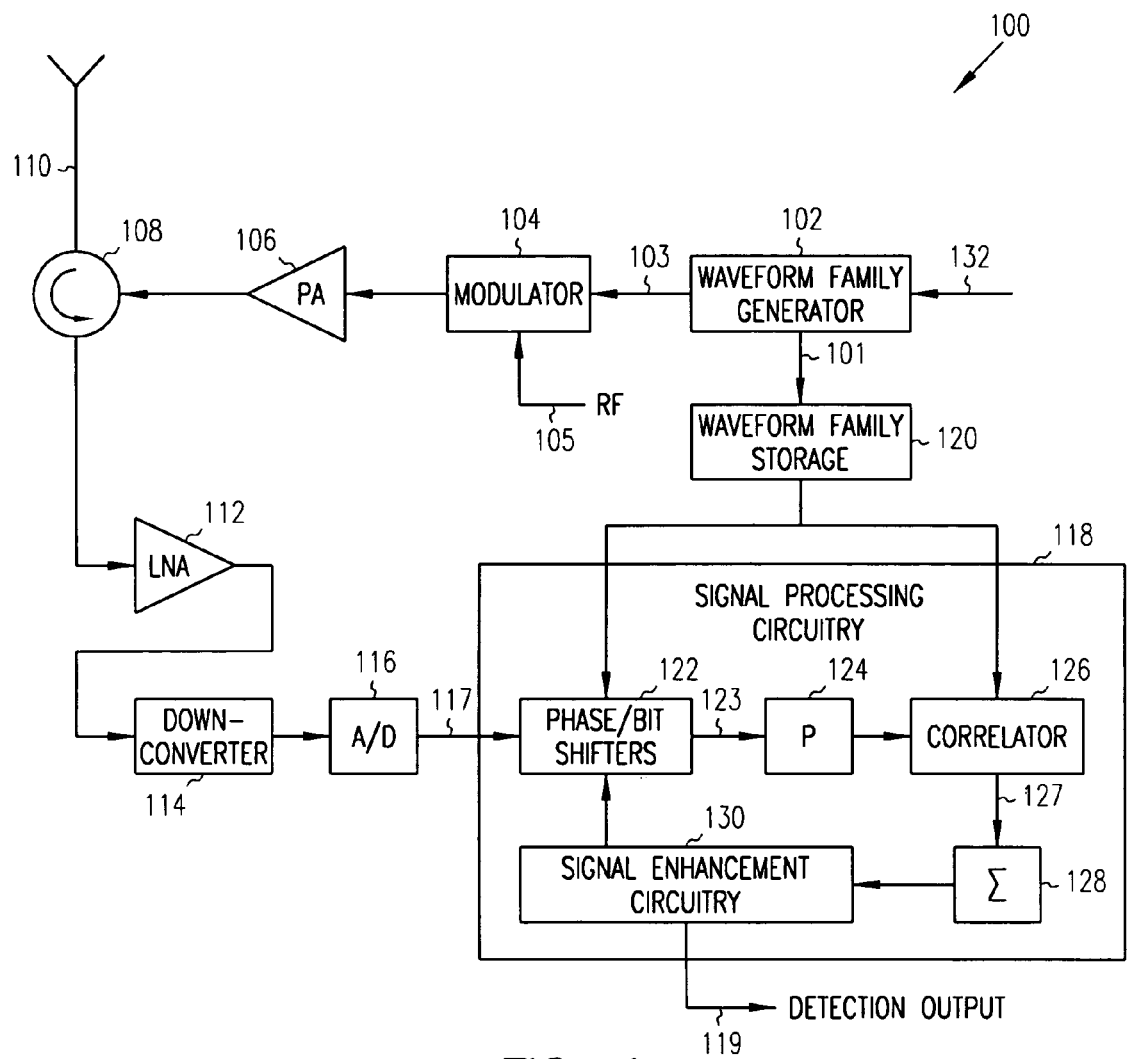
FIG. 1 is a block diagram of an adaptive waveform radar system in accordance with some embodiments of the present invention.

FIG. 1 is a block diagram of an adaptive waveform radar system in accordance with some embodiments of the present invention. Adaptive waveform radar system 100 transmits a selected waveform of a family of related waveforms and either phase shifts or bit shifts the radar return signal for correlating with the other waveforms of the family. In some embodiments, phase shifting may be performed to null an unwanted target or clutter, while bit shifting may be performed to enhance a desired target, although the scope of the invention is not limited in this respect. In some embodiments, the bits of the return signal may be either phase shifted or bit shifted to match a bit of each one of the other waveforms of the family prior to correlation.

In some embodiments, a subfamily of waveforms may be selected for re-correlating the return signal with waveforms of the selected subfamily to generate an enhanced detection output. In some further embodiments, radar ambiguity function shaping may allow adaptive waveform families to be generated and selected for a particular scenario.

Adaptive waveform radar system 100 comprises circuitry to transmit selected waveform 103 of a family of waveforms, and signal processing circuitry 118 to generate detection output 119. Signal processing circuitry 118 either phase-shifts or bit-shifts radar return signal 117 for each other waveform of the family and correlates each shifted return signal with a corresponding one of the other waveforms of the family to generate detection output 119. In some embodiments, radar return signal 117 may be either phase shifted or bit shifted until a bit matches a current waveform of the family being used for the subsequent correlation. Radar return signal 117 corresponds to the transmitted selected waveform.

The circuitry for transmitting selected waveform 103 may include modulator 104, power amplifier 106, circulator 108 and antenna 110. Adaptive waveform radar system 100 may also include low-noise amplifier (LNA) 112 to amplify received signals, and down-converter 114 and analog-to-digital (ADC) 116 to down-convert and digitize received signals to generate radar return signal 117. Adaptive waveform radar system 100 may also include circuitry (not separately illustrated) that may be part of conventional radar systems. Adaptive waveform radar system 100 may also include waveform family generator 102 to generate one or more families of waveforms 101 and storage element 120 to store the one or more families of waveforms.

In accordance with some embodiments, signal processing circuitry 118 may include selectable phase/bit shifters 122, permuter (P) 124, correlator 126, summer 128 and signal enhancement circuitry 130. Fast Fourier transform (FFT) circuitry (not separately illustrated) may also be included. The operation of these elements is described in more detail below. Although the elements of signal processing circuitry 118 are illustrated as separate functional elements, one or more of these functional elements may be combined, and in some embodiments, may be implemented by one or more digital signal processors (DSPs).

In accordance with some embodiments of the present invention, signal processing circuitry 118 may phase shift radar return signal 117. In these embodiments, selectable phase/bit shifters 122 phase shifts all bits of radar return signal 117 to match a selected bit (e.g., a first bit) of radar return signal 117 with a corresponding selected bit (e.g., a first bit) of a current waveform (i.e., the waveform of the family currently being used for correlating) of the family prior to correlating in correlator 126 with the current waveform.

In some embodiments, radar return signal 117 may be phase-modulated or phase rotated by selectable phase/bit shifters 122 so that a selected bit of radar return signal 117 matches a corresponding selected bit of the current waveform. This phase-shifting process may be performed for each remaining waveform of the family, and the correlation outputs may be accumulated and summed by summer 128 for the correlations performed with each waveform of the family. In accordance with these embodiments, signal processing circuitry 118 performs this cyclic process by repeating the phase shifting and correlating for each waveform of the family, and summing correlation outputs 127 to generate detection output 119. In some embodiments, when the selected bit (e.g., the first bit) of radar return signal 117 matches the corresponding selected bit (e.g., the first bit) of a waveform of the family, signal processing circuitry 118 may refrain from performing a phase shift on the return signal prior to correlating because no phase shift is necessary to match the bits.

In some embodiments, signal processing circuitry 118 bit-shifts radar return signal 117. In these embodiments, selectable phase/bit shifters 122 bit-shifts bits of radar return signal 117 to match a selected bit (e.g., a first bit) of radar return signal 117 with a bit of a current waveform of the family prior to permuting and correlating with a portion of the current waveform. In these embodiments, signal processing circuitry 118, as part of a cyclic process, repeats the bit shifting and correlating for each waveform of the family and sums correlation outputs to generate detection output 119. When the selected bit (e.g., the first bit) of radar return signal 117 initially matches the corresponding bit (e.g., the first bit) of a waveform of the family, selectable phase/bit shifters 122 may refrain from performing a bit-shift on the return signal prior to the permuting and correlating. As this bit-shifting process is performed for each remaining waveform of the family, the correlation outputs are accumulated and summed for the correlations performed with each waveform of the family.

When bit shifting is performed, bits of the return signal may be shifted until one or more bits match bits of the current waveform. When bit shifting is performed, only a portion waveform (i.e., less than the entire code length) is correlated because the return signal may be shifted a number of bits.

Permuter 124 may operate when selectable phase/bit shifters 122 perform bit shifting and may permute shifted bits 123 of radar return signal 117. In some embodiments, permuter 124 may perform a permutation transformation 'P' by multiplying shifted bits 123 by a rule or modulus of the code length.

In some embodiments, the phase shifting or bit shifting and bit-matching can be viewed as a sliding correlation. In some embodiments, a first correlation may initially be performed without either phase shifting or bit shifting the return signal by correlating radar return signal 117 with the selected (i.e., the transmitted) waveform. The subsequent correlation outputs from the shifted return signals may be combined with the correlation output of this first correlation.

Signal enhancement circuitry 130 may select either a phase-shifting process or a bit-shifting process and may instruct selectable phase/bit shifters 122 to either phase-shift or bit-shift radar return signal 117 for correlating with waveforms of the family. In some embodiments, signal enhancement circuitry 130 instructs selectable phase/bit shifters 122 to phase-shift radar return signal 117 when an unwanted target is to be nulled, and instructs selectable phase/bit shifters 122 to bit-shift radar return signal 117 when a desired target is to be enhanced. In some embodiments, selectable phase/bit shifters 122 may be configurable by signal enhancement circuitry 130 to either phase-shift or bit-shift the return signal depending on the situation.

In some embodiments, signal enhancement circuitry 130 selects a subfamily of the waveforms for re-correlating radar return signal 117 with waveforms of the selected subfamily to generate a possibly enhanced detection output corresponding to detection output 119. When an unwanted target is detected, signal enhancement circuitry 130 may select a subfamily from the family of waveforms with a null at or near an unwanted target. In some embodiments, the selected subfamily of waveforms may have an ambiguity function with a null at or near the unwanted target. In these embodiments, signal processing circuitry 118 may reprocess radar return signal 117 by phase-shifting all the bits of radar return signal 117 to match a selected bit of radar return signal 117 with a corresponding selected bit of a current waveform of the subfamily. Signal processing circuitry 118 may then correlate the phase-shifted radar return signal with the current waveform of the selected subfamily to generate an enhanced detection output. Signal processing circuitry 118 repeats the phase-shifting and correlating for each waveform of the selected subfamily, and sums correlation outputs to generate the enhanced detection output.

When a desired target's signal-to-noise ratio (SNR) is to be enhanced, signal enhancement circuitry 130 may select a subfamily from the family of waveforms with a peak at or near the desired target. In some embodiments, the selected subfamily may have an ambiguity function with a peak at or near the desired target. In these embodiments, signal processing circuitry 118 reprocesses radar return signal 117 by bit-shifting all the bits of radar return signal 117 to match a selected bit of radar return signal 117 with a bit of a current waveform of the subfamily. Signal processing circuitry 118 may then correlate a portion of the bit-shifted radar return signal with a portion of the current waveform of the selected subfamily to generate the enhanced detection output. Signal processing circuitry 118 repeats the bit-shifting and correlating for each waveform of the selected subfamily and sums correlation outputs to generate enhanced detection output 119.

In accordance with some embodiments, waveform family generator 102 may generate a family of waveforms 101. The family of waveforms 101 may together comprise at least partly or nearly orthogonal waveforms (i.e., pseudo-orthogonal waveforms). In these embodiments, at least partial orthogonality may be achieved by combining the waveforms of the family.

In some embodiments, the family of waveforms may be associated with one or more radar ambiguity functions. The family of waveforms may comprise phase-coded waveforms. In some embodiments, the family of waveforms may comprise bi-phase waveforms, while in other embodiments, the family of waveforms may comprise poly-phase waveforms. Each waveform of the family including the selected waveform may be represented by a code sequence of ones and zeroes or ones and minus ones. In some embodiments, modulator 104 may be a bi-phase modulator that phase-modulates radio-frequency (RF) signal 105 with either a zero or 180-degree phase depending on bits of the code sequence.

In some embodiments, each waveform of the family including the selected waveform may comprise groups of bits. In these embodiments, modulator 104 may be a poly-phase modulator that phase-modulates RF signal 105 with a phase depending on each group of bits of the code sequence. In some embodiments, each group of bits may represent 4, 8, 16, 32, or 64 conditions or possible phase-combinations, for example. In some embodiments, the codes comprising the waveforms may be almost any pseudo-orthogonal codes such as Barker Codes, although other codes such as Golay codes may also be suitable.

In some embodiments, the family of waveforms may be represented or stored as a matrix having dimensions of the code length by the number of the waveforms of the family. The matrix may be an N×M matrix, where N is the number of waveforms of the family and M is the code length of each waveform. M, the number of bits representing a waveform, may comprise a power of two, such as 64, 128, 256, etc, although this is not a requirement. N, the number of waveforms of a family, may range from as little as two to up to one-hundred or more.

In some embodiments, the family of waveforms includes one or more subfamilies of waveforms. Each of the one or more subfamilies may be pseudo-orthogonal and associated with one or more radar ambiguity functions.

In some embodiments, selectable phase/bit shifters 122 either phase-shifts or bit-shifts radar return signal 117 based on input from signal enhancer 130. Correlator 126 may correlate an either phase-shifted or bit-shifted return signal with a current waveform of the family (i.e., a waveform that was not transmitted or used for generating the transmit signal). In some embodiments, correlator 126 may perform a circular (i.e., non-linear) correlation. Summer 128 may accumulate correlation outputs 127 from each correlation performed by correlator 126. In some embodiments, a fast Fourier transform (FFT) may be performed on the correlation outputs 127. Correlation outputs 127 may represent the correlation functions generated by performing a correlation. In other embodiments, an FFT may be performed elsewhere in the signal processing path, such as prior to the operation of selectable phase/bit shifters 122.

In some embodiments, signal processing circuitry 118 may initially select one of the waveforms 103 of the family for modulation and transmission based on an ambiguity diagram of the waveforms of the family. The ambiguity diagram for the family may comprise a combination of the ambiguity function for each waveform in the family. In some embodiments, the waveform selected for transmission may have a null region at an undesired target or clutter. In some embodiments, the waveform selected may be selected based on the ambiguity diagram to enhance a SNR of a selected target or target region.

In some embodiments, signal processing circuitry 118 may select a second family of waveforms based on an initial detection output generated by processing and then reprocessing a radar return signal from a first family. The second family of waveforms may be based on ambiguity functions with nulls at or near unwanted targets or clutter, or peaks at or near desired targets. In these embodiments, a second selected waveform may be selected from the second family for transmission and radar return signal 117 may be either phase-shifted or bit shifted to match a bit of each of the other waveforms of the second family prior to correlation with each of the other waveforms of the second family. In this way, further enhancement to the detection output may be achieved.

In some embodiments, families of waveforms may be generated for many radar system applications and/or environments and stored in waveform family storage element 120 for subsequent selection and use. In some embodiments, detections, a-priori information and threat/scheduling may be used as inputs 132 to waveform generator to determine the critical areas in the ambiguity function to concentrate on when generating a family of waveforms and/or selecting a waveform from the family for transmission.

Antenna 110 may comprise almost any type of directional antenna suitable for transmission and/or reception of radar signals. In some embodiments (not illustrated), adaptive waveform radar system 100 may employ separate transmit and receive antennas.

As can be seen, adaptive waveform radar system 100 uses an approach to radar waveform design and signal processing which allows adaptive waveform radar system 100 to send a single waveform and process the radar return as if the entire family of waveforms was transmitted. Adaptive waveform radar system 100 may employ multiple adaptive waveform families and signal processing techniques that allow radar ambiguity function design in real time. As described herein, the signal processing techniques employed by signal processing circuitry 118 include bit-shift processing techniques, phase-shift processing techniques and ambiguity function shaping techniques.

The bit-shift or cyclic processing techniques may be used for enhanced target SNR, classification of target and/or clutter, distribution of noise, and relocation of interference energy, although the scope of the invention is not limited in this respect. The phase-shift processing techniques may provide unprecedented performance for nulling out unwanted targets and may produce low-range side lobes compared with some conventional radar systems. The phase-shift processing techniques may also utilize a waveform family ambiguity diagram to generate and identify one or more null regions. The phase-shift processing techniques may identify one or more unwanted targets and may shift these one or more unwanted targets and into the null regions, although the scope of the invention is not limited in this respect. The ambiguity function shaping techniques may employ real-time processing to provide an "adaptive radar ambiguity diagram" in time and space. Multiple adaptive waveform families may also be generated.

Although adaptive waveform radar system 100 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Figure 2:
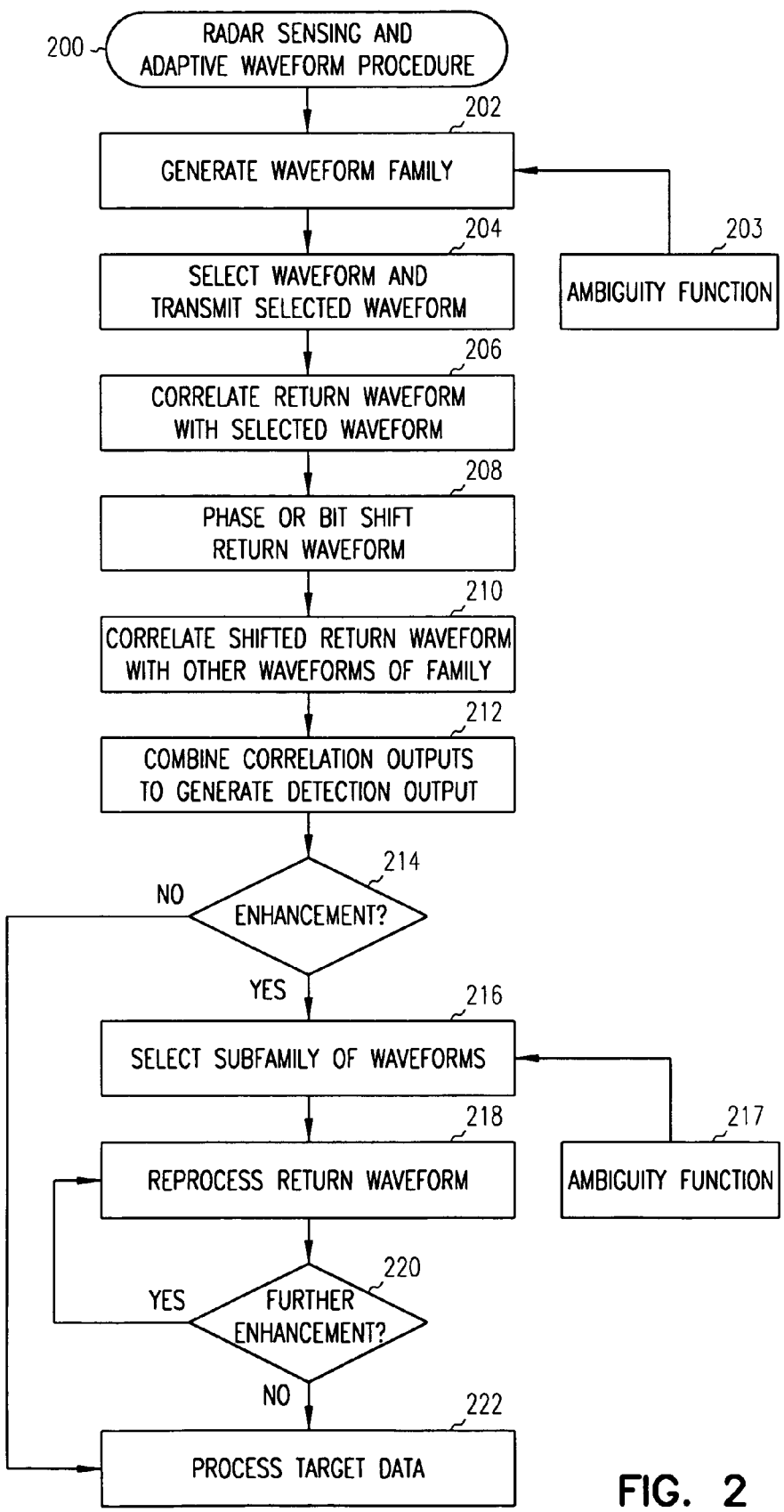
FIG. 2 is a flow chart of an adaptive waveform radar operating procedure in accordance with some embodiments of the present invention.

FIG. 2 is a flow chart of an adaptive waveform radar operating procedure in accordance with some embodiments of the present invention. Adaptive waveform radar operating procedure 200 may be performed by a radar system, such as adaptive waveform radar system 100 (FIG. 1), to transmit a single waveform of a waveform family and process the radar return as though the entire family were transmitted. Desired targets may be enhanced and/or unwanted targets may be nulled through subsequent reprocessing of the radar return using a selected subfamily of the family of waveforms. In some embodiments, one or more additional waveform families may be generated allowing the radar ambiguity function to be designed in real time for further enhancement of detection outputs.

Operation 202 comprises generating a family of waveforms. In some embodiments, operation 202 may generate a family of waveforms based on one or more ambiguity functions 203. The waveforms of a family may be at least partially or pseudo-orthogonal. Operation 202 may be performed by waveform family generator 102 (FIG. 1).

Operation 204 comprises selecting a waveform from the family for transmission by the radar system. In some embodiments, the waveform may be randomly selected from the family. In other embodiments, the waveform may be selected based on its ambiguity function. For example, the ambiguity function for the selected waveform may have nulls and/or peaks. In some embodiments, a system controller or signal processing circuitry 118 (FIG. 1) may select the particular waveform for transmission.

Operation 206 comprises performing a first or initial correlation by correlating the radar return with the selected waveform. Operation 206 may be referred to as autocorrelation, although the scope of the invention is not limited in this respect. Operation 206 may be performed by correlator 126 (FIG. 1).

Operation 208 comprises either phase shifting or bit shifting bits of the radar return to match a bit with a current waveform from the family of waveforms. Operation 208 may be performed by selectable phase/bit shifters 122 (FIG. 1). In some embodiments, signal enhancement circuitry 130 (FIG. 1) may instruct selectable phase/bit shifters 122 (FIG. 1) whether to perform either phase shifting or bit shifting. When operation 208 performs bit shifting, the shifted bits may be permuted by a permutation transformation. When bit shifting is performed, bits of the return signal may be shifted until one or more bits match bits of the current waveform.

Operation 210 comprises correlating the shifted return signal with the current waveform of the family. When bit shifting is performed, only a portion waveform (i.e., less than the entire code length) is correlated because the return signal may be shifted a number of bits. Operations 208 and 210 may be repeated for each remaining waveform of the family (i.e., other than the transmitted waveform) and correlation outputs may be accumulated. Operation 210 may be performed by correlator 126 (FIG. 1).

Operation 212 accumulates the correlation outputs from operation 210. In some embodiments, operation 212 may sum the correlation outputs. Operation 212 may be performed by summer 128 (FIG. 1). A detection output may be generated from the accumulated correlation outputs. In some embodiments, an FFT may be performed on the correlation outputs after correlation, although the scope of the invention is not limited in this respect.

Operation 214 determines whether further enhancement of the detection output is desired. When further enhancement is desired, operation 216 is performed. When further enhancement is not desired, further processing of the radar return may not be necessary, and operation 222 may be performed, although the scope of the invention is not limited in this respect.

Operation 216 comprises selecting a subfamily of waveforms. The subfamily may be selected from the family of waveforms generated in operation 202 and used in operations 204 through 210. In some embodiments, the subfamily may be selected based on one or more ambiguity functions 217 to enhance a desired target and/or null an undesired target or clutter. Operation 216 may be performed by signal enhancement circuitry 130 (FIG. 1).

Operation 218 comprises preprocessing the radar return signal (i.e., the transmitted waveform) by re-performing operations 208 through 212 for waveforms of the subfamily (i.e., rather than the entire family). An enhanced detection output may be generated after operation 218 which may include an enhanced target and/or a nulled undesired target.

Operation 220 determines whether further enhancement is desired. In some embodiments, when further enhancement is desired, operation 218 is performed with another subfamily. This process of reprocessing the same radar return signal may be performed again for any subfamily. When further enhancement is not desired, further processing of the radar return may not be necessary, and operation 222 may be performed, although the scope of the invention is not limited in this respect.

In some embodiments, when further enhancement is desired, operations 202 through 218 may be performed with a different family of waveforms. In these embodiments, a new waveform family may be generated in operation 202 associated with an ambiguity function that may be designed to enhance one or more desired targets or null one or more unwanted targets or clutter.

Operation 222 comprises processing detection outputs (e.g., target data). Operation 222 may include identifying or classifying the desired target vs. clutter.

Although the individual operations of procedure 200 are illustrated and described as separate operations, one or more of the individual operations may be performed concurrently, and nothing requires that the operations be performed in the order illustrated.

Figure 3A:
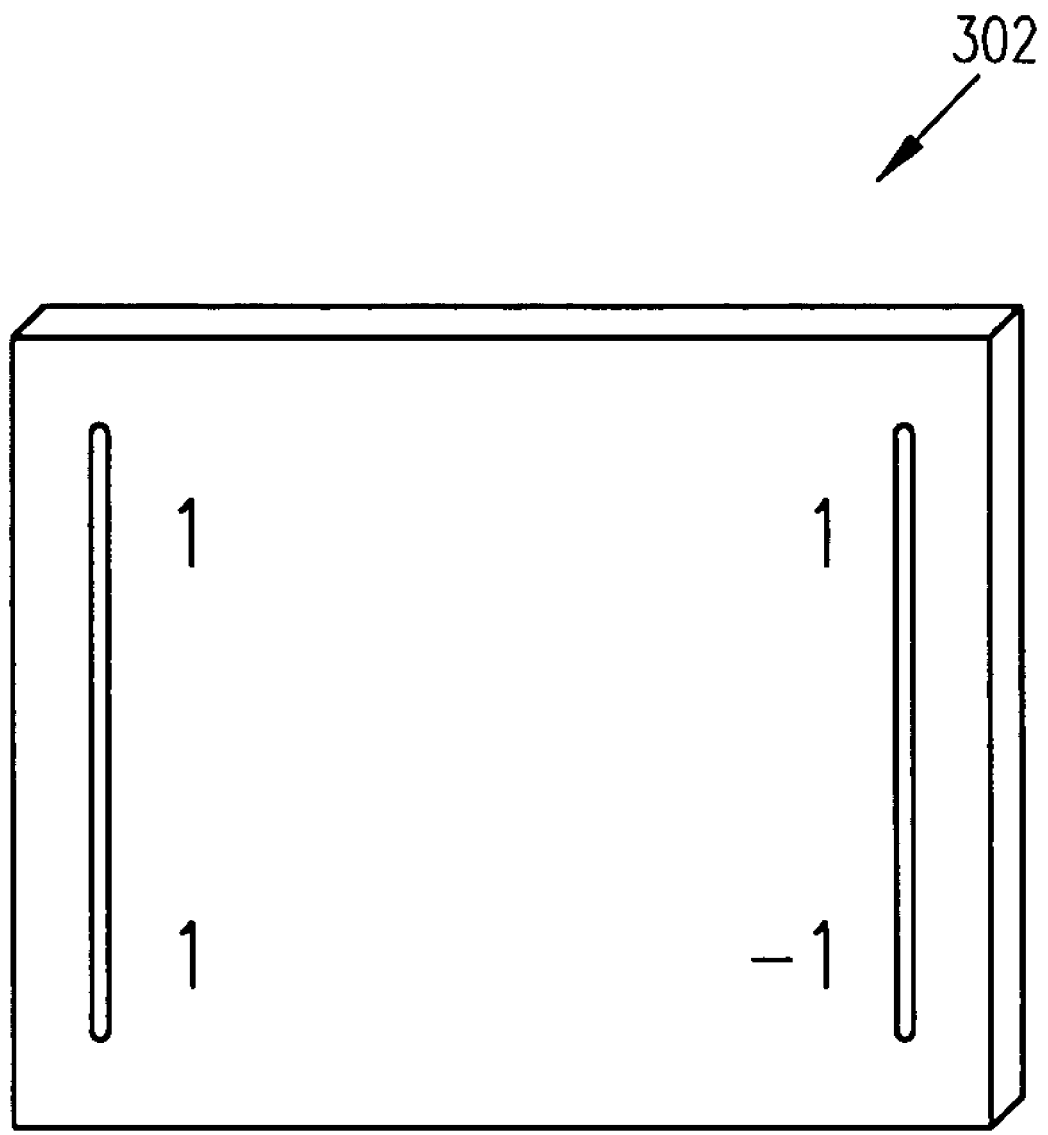
FIGS. 3A, 3B and 3C illustrate the generation of a waveform family in accordance with some embodiments of the present invention.
Figure 3B:
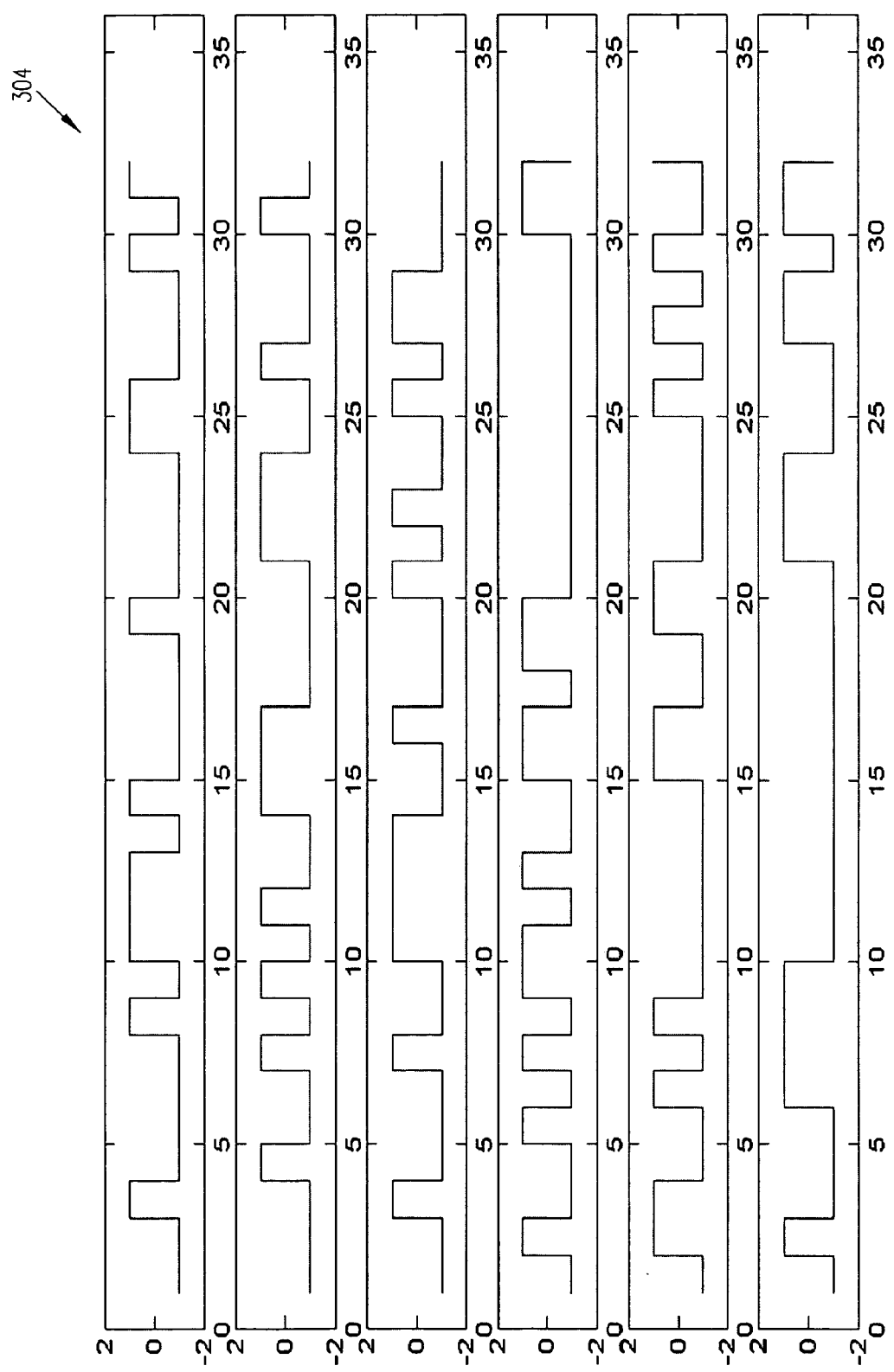
Figure 3C:
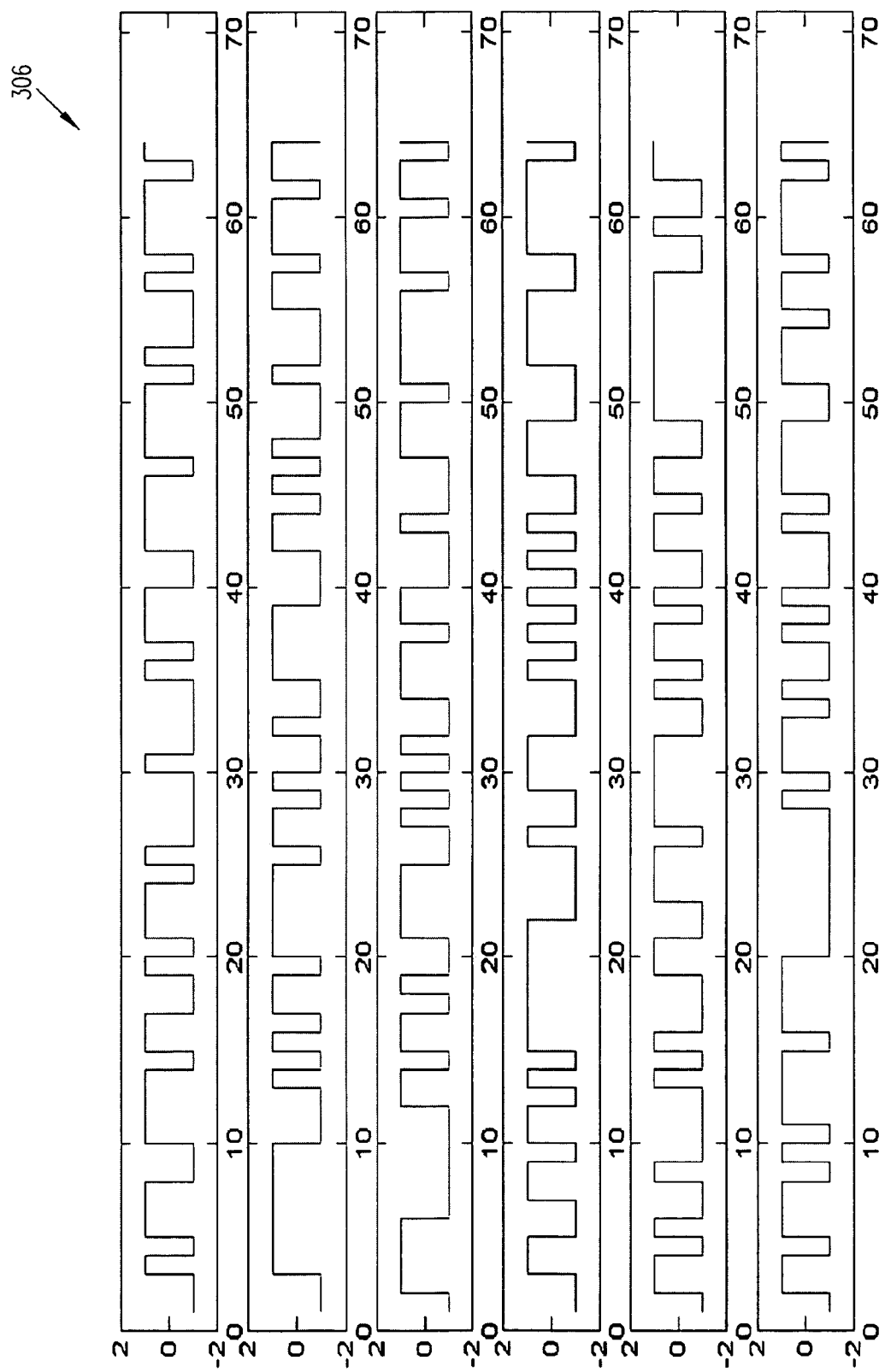

FIGS. 3A, 3B and 3C illustrate the generation of a waveform family in accordance with some embodiments of the present invention. The generation of adaptive waveforms by waveform generator 102 (FIG. 1) may depend upon the particular radar design and/or application and radar system performance requirements. In some embodiments, waveform generator 102 (FIG. 1) generates an adaptive waveform family or matrix of adaptive waveforms based on a radar system's performance requirements. From a seed orthogonal matrix or pseudo random orthogonal matrix (e.g., seed matrix 302 (FIG. 3A)), a series of waveform families 304 (FIG. 3B) & 306 (FIG. 3C) may be generated using multi-scale shuffling and/or modulation steps. The characteristics of the shuffling and/or modulation may determine the code features (e.g., correlation and spectral signatures), which may be dictated by the specific application scenarios. For example, from a two by two bi-phase seed matrix, such as seed matrix 302, a waveform matrix, $W_{m \times n}$, may be generated. Depending on the design, the waveform matrix may be used to generate one waveform family or multiple waveform families. The code length m may equal any power of two, although this is not a requirement.

FIG. 4 illustrates ambiguity diagrams of waveforms in accordance with some embodiments of the present invention. Ambiguity functions may be used to evaluate the performance capabilities of each waveform family for a radar application. In some embodiments, signal processing circuitry 118 (FIG. 1) may generate an ambiguity diagram for each waveform family to assess the range side lobes (i.e., interferences), Doppler tolerance and other radar characteristics. In general, a transmit waveform may be selected from an optimal waveform family. For example, an optimal waveform family may be a best fitted ambiguity diagram.

Figure 4A:
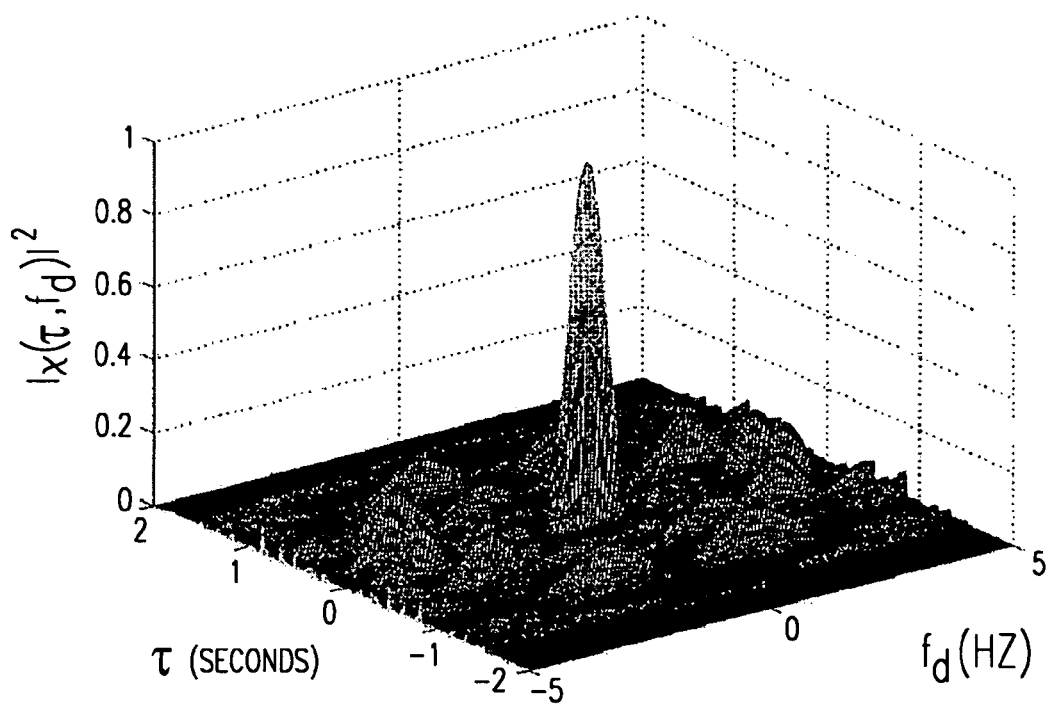
FIG. 4 illustrates ambiguity diagrams of waveforms in accordance with some embodiments of the present invention.
Figure 4B:
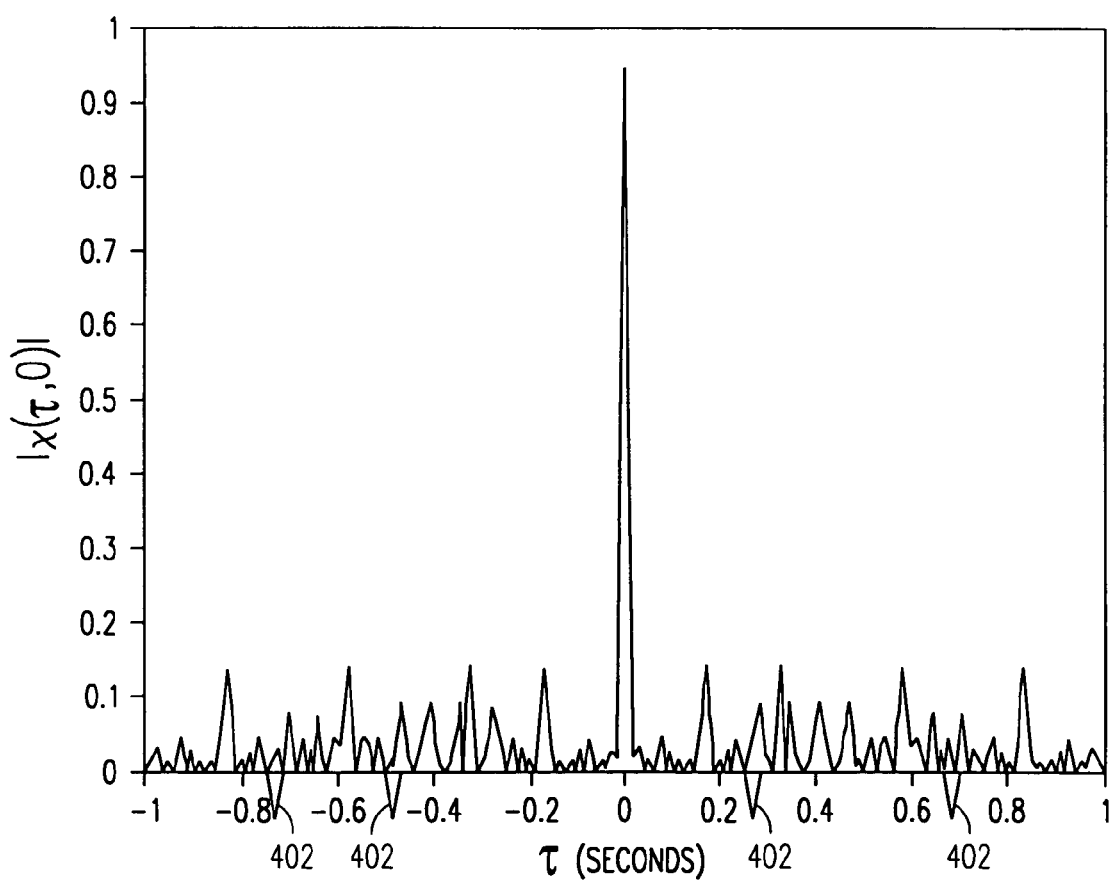
Figure 4C:
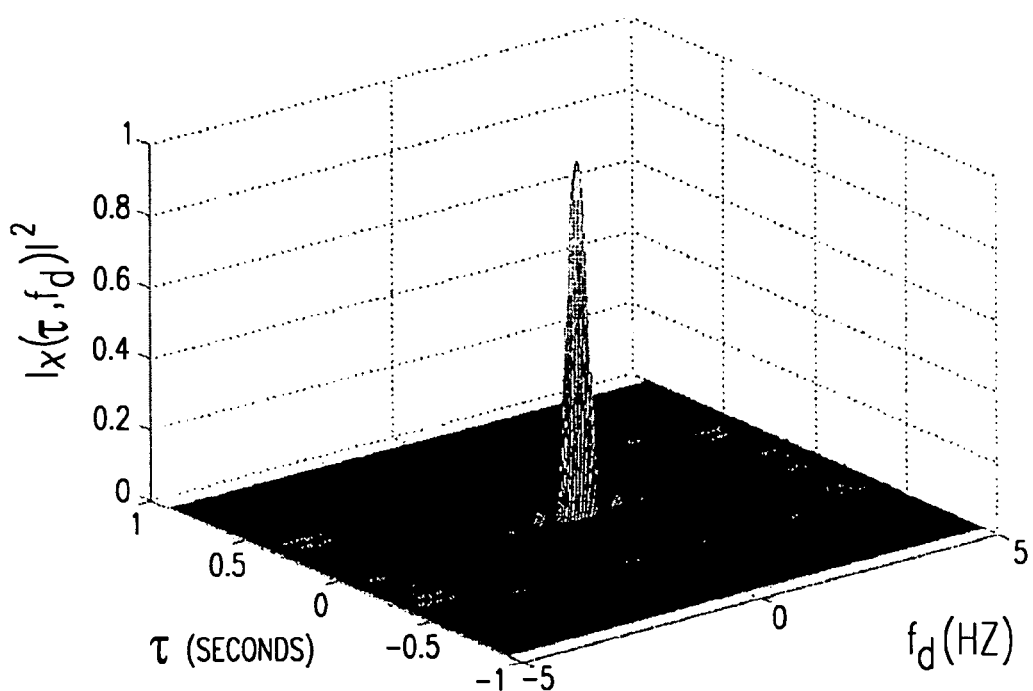
Figure 4D:
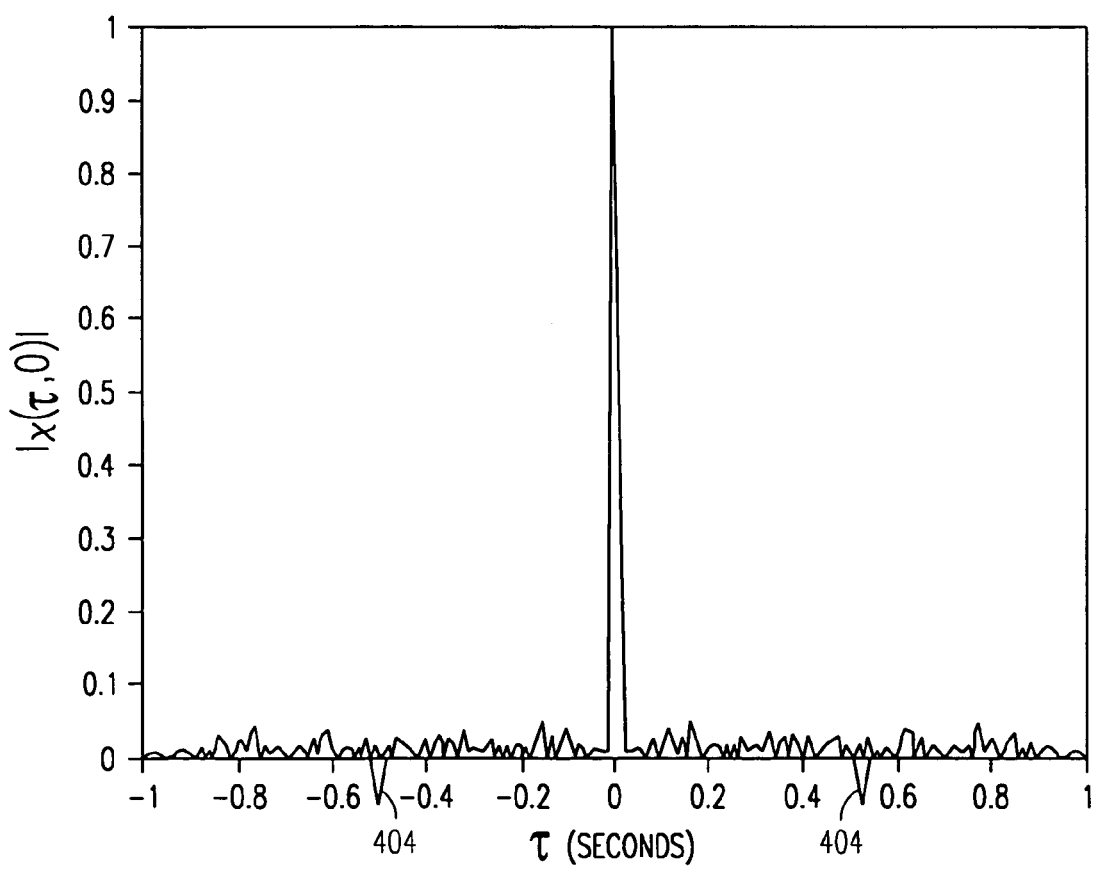

FIGS. 4A & 4B illustrate ambiguity diagrams for one 64-Bit biphase waveform and FIGS. 4C & 4D illustrate ambiguity diagrams for the waveform's associated waveform family. These ambiguity diagrams may correspond to the waveform family illustrated in FIGS. 3B & 3C which comprises six 64-bit waveforms. These may be used, for example, to enhance a selected target's SNR and/or to create a null region to null-out unwanted interferences. The ambiguity diagrams illustrated in FIGS. 4A & 4B correspond to an individual waveform and the ambiguity diagrams illustrated in FIGS. 4C & 4D correspond to the associated family of waveforms. The ambiguity diagrams may include one or more nulls 402 and 404. Through selection of particular waveforms, signal processing by circuitry 118 (FIG. 1) may provide the nulls at unwanted targets or clutter.

Figure 5:
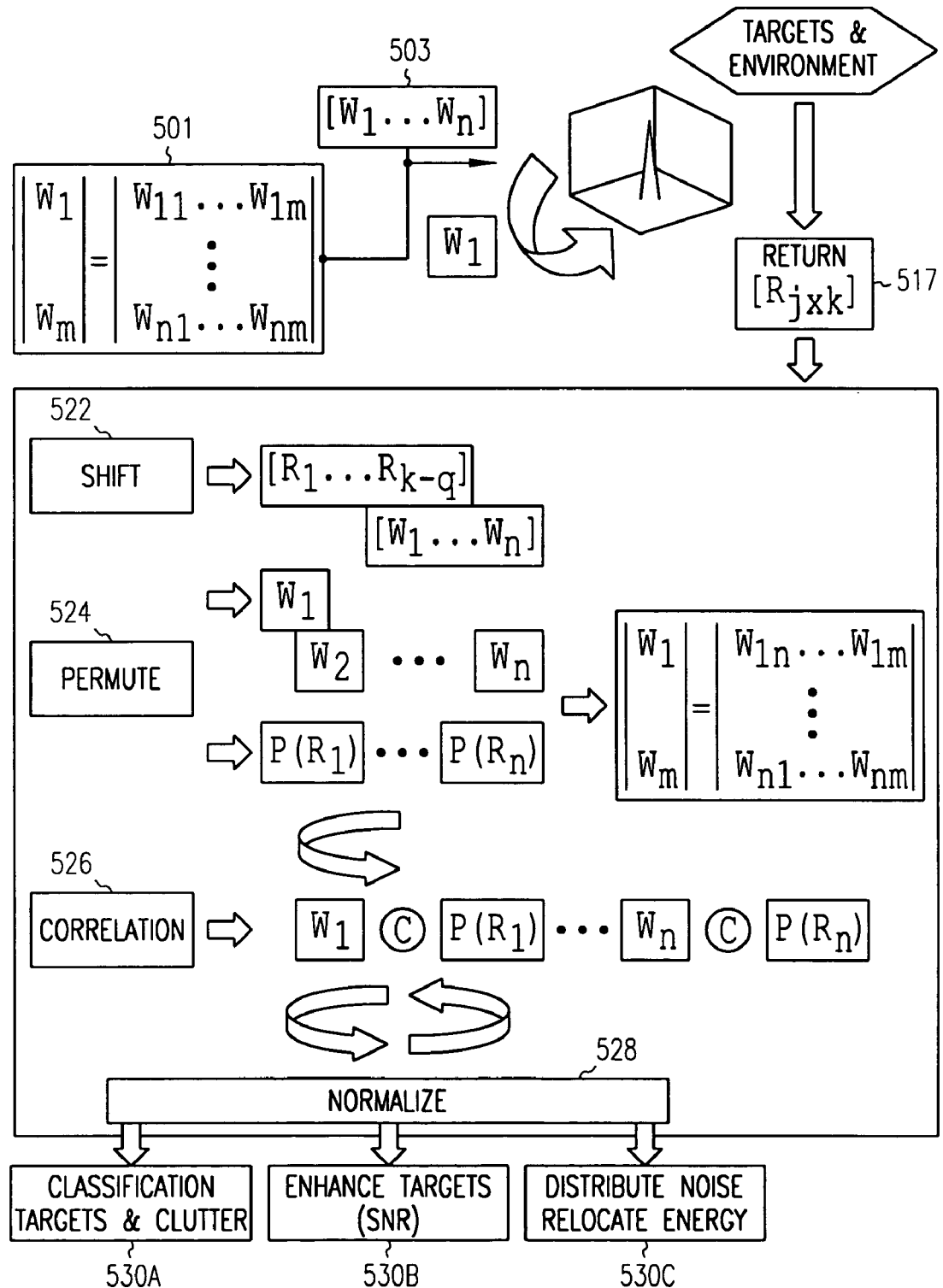
FIG. 5 illustrates the operation of signal processing circuitry when performing bit shifting.

FIG. 5 illustrates the operation of signal processing circuitry 118 (FIG. 1) when performing bit shifting. Return signal 517 of selected transmit waveform 503 from waveform family 501 is bit shifted in operation 522, permuted in operation 524 and correlated in operation 526. These processes may be performed for other waveforms of a waveform family or subfamily and accumulated, summed and averaged in operation 528. Operation 530A may classify targets and/or clutter, operation 530B may enhance a selected or desired target, and operation 530C may distribute noise and/or relocate energy. In FIG. 5, waveform family 501 may correspond to waveform family 101 (FIG. 1), selected transmit waveform 503 may correspond to selected waveform family 103 (FIG. 1), and radar return signal 517 may correspond to radar return signal 117 (FIG. 1), although the scope of the invention is not limited in this respect. In FIG. 5, operation 522 may be performed by selectable phase/bit shifter 122 (FIG. 1), operation 524 may be performed by permuter 124 (FIG. 1), operation 526 may be performed by correlator 126 (FIG. 1), and operations 530A, 530B and 530C may be performed by signal enhancement circuitry 130 (FIG. 1), although the scope of the invention is not limited in this respect.

Operations 522-528 may be described as follows. In the following equation, P represents a permutation transformation, and w represents a coded waveform:

$$\underline{w'(k)} = P_p(w) = w(k \circ p)$$

The circle symbol represents a multiplication modulo having the length of the code 'c'. The Fourier transformation of the permuted waveform can be represented as:

$$\underline{\hat{w}'(k)} = \hat{w}(k \circ p')$$

The permutation corresponds to a permutation in frequency of the original code by another integer P'. So, when the Fourier transformations of a set of permuted codes $\{w_k = P_k(\underline{w})\}$ are aligned within a matrix, the rows of the matrix may have the same entries, listed each in a different order, as illustrated below.

$$\hat{M} = \begin{pmatrix} \hat{w}_1 & \hat{w}_2 & \cdots & \hat{w}_n \\ \hat{w}_3 & \hat{w}_6 & & \vdots \\ \vdots & \vdots & \ddots & \vdots \\ \hat{w}_m & \hat{w}_{2m} & \cdots & \hat{w}_{nm} \end{pmatrix}$$

This is true for the matrix generated from the Fourier transformations of the correlation functions of the codes, comprising the square of the absolute values of the Fourier transformations of the waveform codes. Adding the correlation functions of a set of a family of codes provides:

$$|\tilde{A}(k)| = \left| \sum_j A_{c_j}(k) \right| \cong \delta(k)$$

Figure 6:
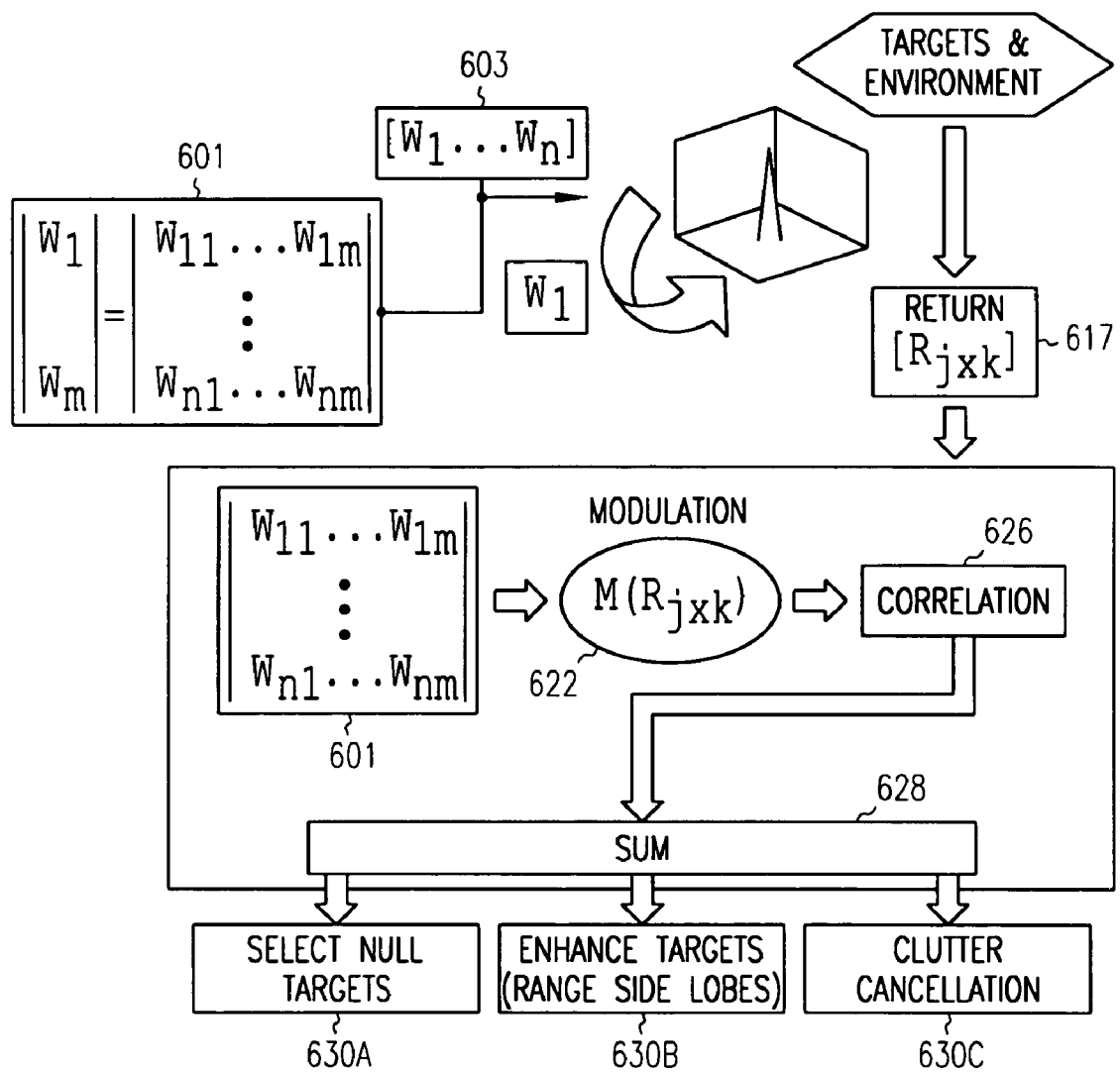
FIG. 6 illustrates the operation of signal processing circuitry when performing phase shifting.

FIG. 6 illustrates the operation of signal processing circuitry 118 (FIG. 1) when performing phase shifting. Return signal 617 of selected transmit waveform 603 from waveform family 601 is phase shifted in operation 622 to match a current waveform of waveform family 601. The phase shifted (i.e., transformed) waveform is correlated in operation 626. These processes may be performed for other waveforms of a waveform family or subfamily and accumulated, summed and averaged in operation 628. Operation 630A may select a null and null an unwanted target, operation 630B may enhance a selected or desired target, and operation 630C may cancel clutter. In FIG. 6, waveform family 601 may correspond to waveform family 101 (FIG. 1), selected transmit waveform 603 may correspond to selected waveform family 103 (FIG. 1), and radar return signal 617 may correspond to radar return signal 117 (FIG. 1), although the scope of the invention is not limited in this respect. In FIG. 6, operation 622 may be performed by selectable phase/bit shifter 122 (FIG. 1), operation 626 may be performed by correlator 126 (FIG. 1), and operations 630A, 630B and 630C may be performed by signal enhancement circuitry 130 (FIG. 1), although the scope of the invention is not limited in this respect.

Figure 7:
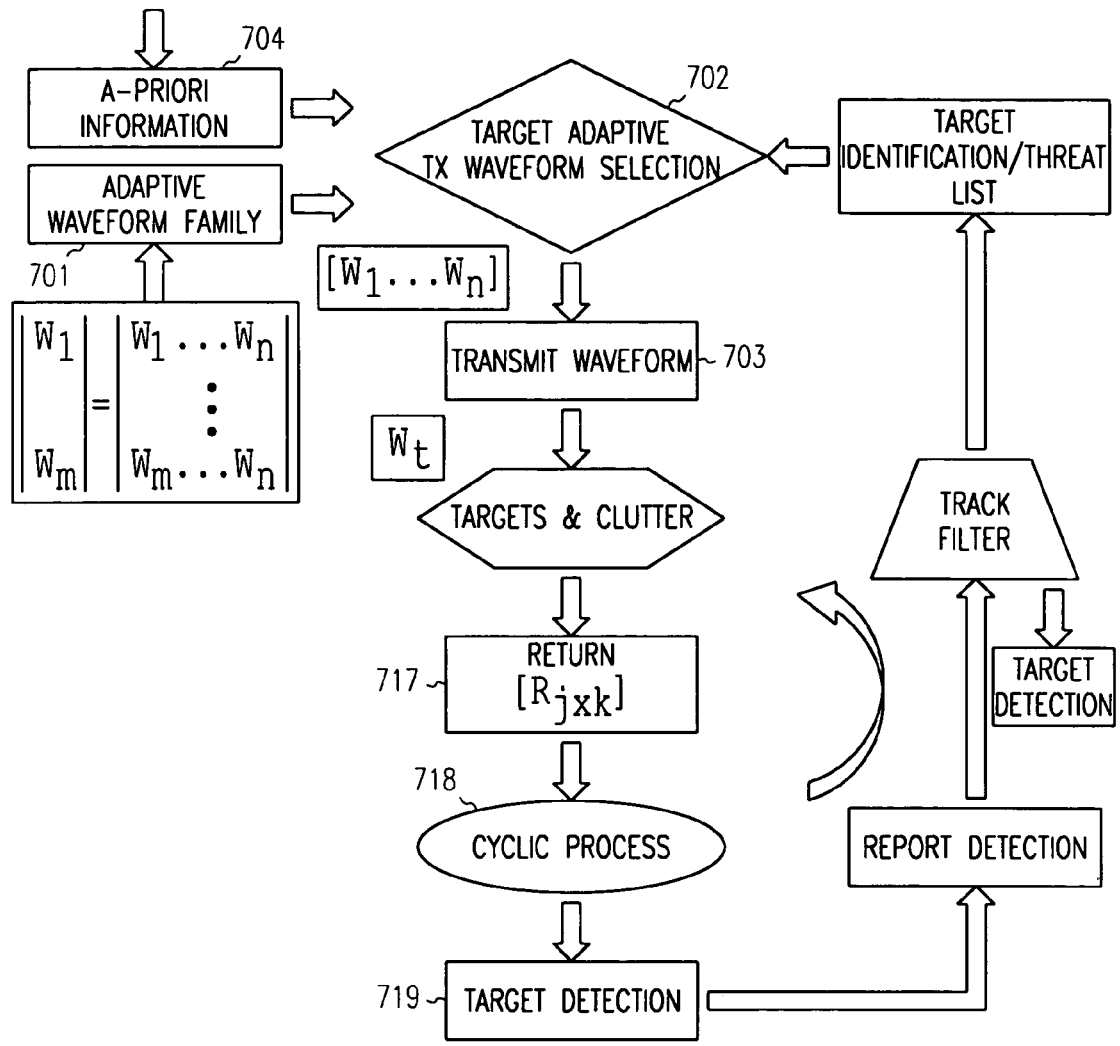
FIG. 7 illustrates the operation of the adaptive waveform radar system of FIG. 1 in accordance with some embodiments of the present invention, including the generation of an adaptive waveform family and the selection of a waveform from the family for transmission.

FIG. 7 illustrates the operation of adaptive radar system 100 (FIG. 1) in accordance with some embodiments of the present invention, including the generation of an adaptive waveform family and the selection of a waveform from the family for transmission. In some embodiments, an adaptive and/or an environment sensing transmit waveform (corresponding to transmit waveform 703) may be selected from a low range side lobe, Doppler-intolerant search waveform family, although the scope of the invention is not limited in this respect. An adaptive and/or an environment sensing transmit waveform family (corresponding to waveform family 701) may be generated from an adaptive waveform family generation algorithm, although the scope of the invention is not limited in this respect. The selection of adaptive waveform family 701 as well as the particular transmit waveform (i.e., transmit waveform 703) from its family may be performed based on a-priori information 704, such as ambiguity regions of interest, and a group of waveforms that can be combined to achieve a desired effect.

After transmission, radar return 717 may be processed by cyclic processing process 718, which includes the phase shifting process, the bit shifting process or the ambiguity function shaping process described above. Cyclic processing process 718 may process and correlate a single radar return with the waveforms of the family 701 to achieve the effect to multiple waveforms (e.g., multiple returns from a plurality of complementary waveforms). The sum of the correlations corresponds to target detection 719.

In some embodiments, because a waveform having a low range side lobe ambiguity function is used, the number of false detections may be reduced from post processed returns crossing a constant false alarm rate (CFAR) threshold. In some embodiments, the detections 719, a-priori information 704 and threat/scheduling may be used as inputs to determine critical areas in the ambiguity function to concentrate on.

In some embodiments, a new (i.e., a second) family of the adaptive waveforms may be selected or generated by waveform selector 702. A waveform from this new family may be transmitted and again its return may be processed by cyclic processing process 718. The reported detections may be compared to known ambiguities to decide if yet another adaptive waveform family should be generated or selected from prior generated waveforms. In some embodiments, an adaptive waveform radar may perform a plurality of loops to work out ambiguities or suggest possible ambiguities. In some embodiments, most ambiguities are worked out in one loop (i.e., the first loop), although the scope of the invention is not limited in this respect.

In FIG. 7, adaptive waveform family 701 may correspond to waveform family 101 (FIG. 1), transmit waveform 703 may correspond to transmit waveform 103 (FIG. 1) and radar return 717 may correspond to radar return signal 117 (FIG. 1). Cyclic processing process 718 may be performed by selectable phase/bit shifters 122 (FIG. 1), correlator 126 (FIG. 1) and summer 128 (FIG. 1), and other operations illustrated in FIG. 7 may be performed by signal enhancement circuitry 130 (FIG. 1).

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A radar system comprising:
   circuitry to transmit a single selected waveform of a family of waveforms associated with one or more radar ambiguity functions; and
   signal processing circuitry to either phase-shift or bit-shift a radar return signal for each other waveform of the family, and to correlate each shifted return signal with a corresponding one of the other waveforms of the family to generate a detection output.

2. The system of claim 1 wherein when the signal processing circuitry is instructed to phase-shift the return signal, the signal processing circuitry phase shifts bits of the return signal to match a selected bit of the return signal with a corresponding selected bit of a current waveform of the family prior to correlating with the current waveform.

3. The system of claim 1 further comprising a waveform family generator to generate the family of waveforms, wherein the family of waveforms together comprises pseudo-orthogonal waveforms.

4. The system of claim 3 wherein the circuitry to transmit comprises a modulator to modulate the selected waveform of the family for transmission and
   wherein the family of waveforms comprise phase-coded waveforms.

5. The system of claim 1 wherein the family of waveforms comprises a matrix having dimensions of a code length of each waveform by a number of the waveforms.

6. The system of claim 3 wherein the family of waveforms comprises one or more subfamilies of waveforms, each of the one or more subfamilies being pseudo-orthogonal and associated with a radar ambiguity function.

7. A radar system comprising:
   circuitry to transmit a selected waveform of a family of waveforms; and
   signal processing circuitry to either phase-shift or bit-shift a radar return signal for each other waveform of the family, and to correlate each shifted return signal with a corresponding one of the other waveforms of the family to generate a detection output,
   wherein when the signal processing circuitry is instructed to phase-shift the return signal, the signal processing circuitry phase shifts bits of the return signal to match a selected bit of the return signal with a corresponding selected bit of a current waveform of the family prior to correlating with the current waveform, and
   wherein the signal processing circuitry repeats the phase-shifting and correlating for each waveform of the family, and sums correlation outputs to generate the detection output.

8. The system of claim 7 wherein when the selected bit of the return signal matches the corresponding selected bit of a waveform of the family, the signal processing circuitry refrains from performing a phase-shift on the return signal prior to the correlating.

9. A radar system comprising:
circuitry to transmit a selected waveform of a family of waveforms; and
signal processing circuitry to either phase-shift or bit-shift a radar return signal for each other waveform of the family, and to correlate each shifted return signal with a corresponding one of the other waveforms of the family to generate a detection output,
wherein when the signal processing circuitry is to bit-shift the return signal, the signal processing circuitry bit-shifts bits of the return signal to match a selected bit of the return signal with a bit of a current waveform of the family and permutes the bit-shifted return signal prior to correlating with the current waveform.

10. The system of claim 9 wherein the signal processing circuitry repeats the bit-shifting, permuting and correlating for each waveform of the family and sums correlation outputs to generate the detection output.

11. The system of claim 10 wherein when the selected bit of the return signal matches a corresponding bit of a waveform of the family, the signal processing circuitry refrains from performing bit-shifts on the return signal prior to the correlating.

12. A radar system comprising:
circuitry to transmit a selected waveform of a family of waveforms; and
signal processing circuitry to either phase-shift or bit-shift a radar return signal for each other waveform of the family, and to correlate each shifted return signal with a corresponding one of the other waveforms of the family to generate a detection output,
wherein the signal processing circuitry comprises signal enhancement circuitry to select either a phase-shifting process or a bit-shifting process and instructs selectable phase/bit shifters of signal processing circuitry to either phase-shift or bit-shift the return signal for correlating with waveforms of the family.

13. The system of claim 8 wherein the signal enhancement circuitry instructs selectable phase/bit shifters to phase-shift the return signal when an unwanted target is to be nulled, and instructs selectable phase/bit shifters to bit-shift the return signal when a desired target is to be enhanced.

14. A radar system comprising:
circuitry to transmit a selected waveform of a family of waveforms;
signal processing circuitry to either phase-shift or bit-shift a radar return signal for each other waveform of the family, and to correlate each shifted return signal with a corresponding one of the other waveforms of the family to generate a detection output; and
signal enhancement circuitry to select a subfamily of the waveforms for re-correlating the return signal with waveforms of the selected subfamily to generate an enhanced detection output.

15. The system of claim 14 wherein the signal enhancement circuitry selects a subfamily from the family of waveforms with a null at or near an unwanted target,
wherein the signal processing circuitry reprocesses the radar return signal by phase-shifting the bits of the radar return signal to match a selected bit of the radar return signal with a corresponding bit of a current waveform of the subfamily, and
wherein the signal processing circuitry correlates the phase-shifted radar return signal with the current waveform of the selected subfamily to generate the enhanced detection output.

16. The system of claim 15 wherein the signal processing circuitry repeats the phase-shifting and correlating for each waveform of the selected subfamily and sums correlation outputs to generate the enhanced detection output.

17. The system of claim 14 wherein the signal enhancement circuitry selects a subfamily from the family of waveforms with a peak at or near a desired target,
wherein the signal processing circuitry reprocesses the radar return signal by bit-shifting the bits of the radar return signal to match a selected bit of the radar return signal with a bit of a current waveform of the subfamily, and
wherein the signal processing circuitry permutes the bit-shifted return signal and correlates the bit-shifted radar return signal with the current waveform of the selected subfamily to generate the enhanced detection output.

18. The system of claim 17 wherein the signal processing circuitry repeats the bit-shifting, permuting and correlating for each waveform of the selected subfamily and sums correlation outputs to generate the enhanced detection output.

19. A radar system comprising:
circuitry to transmit a selected waveform of a family of waveforms;
signal processing circuitry to either phase-shift or bit-shift a radar return signal for each other waveform of the family, and to correlate each shifted return signal with a corresponding one of the other waveforms of the family to generate a detection output; and
a waveform family generator to generate the family of waveforms, wherein the family of waveforms together comprises pseudo-orthogonal waveforms, the family being associated with one or more radar ambiguity functions,
wherein the signal processing circuitry comprises:
selectable phase/bit shifters to either phase-shift or bit-shift the return signal;
a correlator to perform a correlation on the either phase-shifted or bit-shifted return signal with waveforms of the family; and
a summer to combine correlation outputs of the correlator.

20. A radar system comprising:
circuitry to transmit a selected waveform of a family of waveforms; and
signal processing circuitry to either phase-shift or bit-shift a radar return signal for each other waveform of the family, and to correlate each shifted return signal with a corresponding one of the other waveforms of the family to generate a detection output; and a waveform family generator to generate the family of waveforms, wherein the family of waveforms together comprises pseudo-orthogonal waveforms, the family being associated with one or more radar ambiguity functions,
wherein signal processing circuitry is to select one of the waveforms of the family for modulation and transmission based on an ambiguity diagram of the waveforms.

21. The system of claim 20 wherein the signal processing circuitry is to select a second family of waveforms based on the detection output, the second family of waveforms based on ambiguity functions with either nulls at or near unwanted targets or peaks at or near desired targets.

22. A method of operating a radar comprising:
  transmitting a single selected waveform of a family of waveforms associated with one or more radar ambiguity functions;
  either phase-shifting or bit-shifting a radar return signal for each other waveform of the family; and
  correlating each shifted return signal with a corresponding one of the other waveforms of the family to generate a detection output.

23. The method of claim 22 wherein when phase-shifting is performed, the method includes phase shifting bits of the return signal to match a selected bit of the return signal with a corresponding selected bit of a current waveform of the family prior to correlating with the current waveform.

24. The method of claim 22 further comprising generating the family of waveforms, wherein the family of waveforms together comprises pseudo-orthogonal waveforms, the family being associated with one or more radar ambiguity functions.

25. A method of operating a radar comprising:
  transmitting a selected waveform of a family of waveforms;
  either phase-shifting or bit-shifting a radar return signal for each other waveform of the family; and
  correlating each shifted return signal with a corresponding one of the other waveforms of the family to generate a detection output,
  wherein when phase-shifting is performed, the method includes phase shifting bits of the return signal to match a selected bit of the return signal with a corresponding selected bit of a current waveform of the family prior to correlating with the current waveform,
  repeating the phase-shifting and correlating for each waveform of the family; and
  summing correlation outputs to generate the detection output.

26. A method of operating a radar comprising:
  transmitting a selected waveform of a family of waveforms;
  either phase-shifting or bit-shifting a radar return signal for each other waveform of the family; and
  correlating each shifted return signal with a corresponding one of the other waveforms of the family to generate a detection output,
  wherein when bit shifting is performed, the method includes:
  bit shifting bits of the return signal to match a selected bit of the return signal with a bit of a current waveform of the family; and
  permuting the bit-shifted return signal prior to correlating with the current waveform.

27. The method of claim 26 further comprising:
  repeating the bit-shifting, permuting and correlating for each waveform of the family; and
  summing correlation outputs to generate the detection output.

28. A method of operating a radar comprising:
  transmitting a selected waveform of a family of waveforms;
  either phase-shifting or bit-shifting a radar return signal for each other waveform of the family;
  correlating each shifted return signal with a corresponding one of the other waveforms of the family to generate a detection output;
  performing phase shifting when an unwanted target is to be nulled; and
  performing bit-shifting when a desired target is to be enhanced.

29. A method of operating a radar comprising:
  transmitting a selected waveform of a family of waveforms;
  either phase-shifting or bit-shifting a radar return signal for each other waveform of the family;
  correlating each shifted return signal with a corresponding one of the other waveforms of the family to generate a detection output; and
  selecting a subfamily of the waveforms for re-correlating the return signal with waveforms of the selected sub family to generate an enhanced detection output.

30. The method of claim 29 further comprising reprocessing the radar return signal by phase-shifting the bits of the radar return signal to match a selected bit of the radar return signal with a corresponding bit of a current waveform of the subfamily, and
  wherein the phase-shifted radar return signal is correlated with the current waveform of the selected subfamily to generate the enhanced detection output.

31. The method of claim 30 further comprising:
  repeating the phase-shifting and correlating for each waveform of the selected subfamily; and
  summing correlation outputs to generate the enhanced detection output.

32. The method of claim 29 further comprising:
  reprocessing the radar return signal by bit-shifting the bits of the radar return signal to match a selected bit of the radar return signal with a bit of a current waveform of the subfamily;
  permuting the bit-shifted return signal; and
  correlating the bit-shifted radar return signal with the current waveform of the selected subfamily to generate the enhanced detection output.

33. The method of claim 32 further comprising:
  repeating the bit-shifting, permuting and correlating for each waveform of the selected subfamily; and
  summing correlation outputs to generate the enhanced detection output.

34. A radar system comprising:
  circuitry to transmit a selected waveform of a family of waveforms; and
  signal processing circuitry to either phase-shift or bit-shift and permute a radar return signal for each other waveform of the family, and to correlate each shifted return signal with a corresponding one of the other waveforms of the family to generate a detection output,
  wherein the signal processing circuitry is to phase-shift the return signal when an unwanted target is to be nulled, and
  wherein the signal processing circuitry is to bit-shift and permute the return signal when a desired target is to be enhanced.

35. The system of claim 34 wherein when the signal processing circuitry phase-shifts the return signal, the signal processing circuitry phase shifts bits of the return signal to match a selected bit of the return signal with a corresponding selected bit of a current waveform of the family prior to correlating with the current waveform, and
  wherein when the signal processing circuitry bit-shifts and permutes the return signal, the signal processing circuitry bit-shifts bits of the return signal to match a selected bit of the return signal with a bit of a current waveform of the family and permutes the bit-shifted return signal prior to correlating with the current waveform.

36. The system of claim 34 further comprising signal enhancement circuitry to select a subfamily of the waveforms for re-correlating the return signal with waveforms of the selected subfamily to generate an enhanced detection output, the subfamily being selected based on an associated one or more ambiguity functions.

37. The system of claim 36 further comprising a waveform family generator to generate the family of waveforms, wherein the family of waveforms together comprises pseudo-orthogonal waveforms, the family being associated with one or more radar ambiguity functions and comprising one or more subfamilies of waveforms.

* * * * *